United States Patent
Oosawa (10) Patent No.: US 7,035,445 B2
(45) Date of Patent: Apr. 25, 2006

(54) IMAGE POSITION MATCHING METHOD, APPARATUS AND STORAGE MEDIUM

(75) Inventor: Akira Oosawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 656 days.

(21) Appl. No.: 09/799,347

(22) Filed: Mar. 6, 2001

(65) Prior Publication Data
US 2001/0053240 A1    Dec. 20, 2001

(30) Foreign Application Priority Data
Mar. 6, 2000  (JP) .............................. 2000-060547

(51) Int. Cl.
*G06K 9/00*    (2006.01)
(52) U.S. Cl. ..................... 382/130; 382/128
(58) Field of Classification Search ........ 382/130–131, 382/275, 254, 264, 128, 141, 145–150, 294; 600/431; 378/4, 20; 250/580–587
See application file for complete search history.

(56) References Cited

U.S. PATENT DOCUMENTS

| 4,542,459 | A | * | 9/1985 | Riederer ................. 600/431 |
| 4,710,875 | A | * | 12/1987 | Nakajima et al. .......... 378/162 |
| 4,983,835 | A | * | 1/1991 | Takeo ....................... 250/587 |
| 5,291,403 | A | * | 3/1994 | Ito ........................... 250/587 |
| 5,485,371 | A |  | 1/1996 | Ito et al. ................ 364/413.23 |
| 5,535,289 | A | * | 7/1996 | Ito ........................... 382/130 |
| 5,623,560 | A | * | 4/1997 | Nakajima et al. ........... 382/295 |
| 6,111,984 | A | * | 8/2000 | Fukasawa .................. 382/209 |

FOREIGN PATENT DOCUMENTS

| JP | 59-83484 | 5/1984 |
| JP | 3-285475 | 12/1991 |

OTHER PUBLICATIONS

Abstract 59-083484, May 14, 1984.

* cited by examiner

*Primary Examiner*—Jose L. Chen
*Assistant Examiner*—Tom Y. Lu
(74) *Attorney, Agent, or Firm*—Sughrue Mion, PLLC (57) ABSTRACT

Performance of comparative reading of two or more images that are to become the objects of comparative reading is improved with respect to conventional means. An energy subtraction image forming means (structure-emphasized image obtaining means) obtains an energy subtraction image based on each pair of energy subtraction-use original images, and a structural-position relation obtaining means obtains the correlation between structural positions within each pair of energy subtraction image obtained thereby. Based on the correlation between structural positions of the energy subtraction images, an image position matching means matches the positions of the structures between each pair of energy subtraction-use original images.

33 Claims, 3 Drawing Sheets

IMAGE POSITION MATCHING METHOD, APPARATUS AND STORAGE MEDIUM

BACKGROUND OF THE INVENTION

1. Field of the Invention

The present invention relates to an image position matching method and apparatus in which matching the positions of the same structural components contained in two or more images is improved.

2. Description of the Related Art

It is a common practice in a wide variety of fields to read and compare a plurality of two or more images taken of the same subject in order to discern the difference between images, and carry out an inspection of the subject based on the thus discerned difference, etc.

In the industrial products manufacturing industry, for example, images taken of a product when it is new and images taken of the same product after it has been subjected to an endurance test are compared, and attention is focused on the area showing the biggest difference so that an examination as to whether or not there are areas requiring improvement in product endurance can be carried out. In the medical field, doctors read and compare a plurality of radiation images of the diseased part of a patient taken in a time series manner in order to ascertain the course of the disease and determine the proper treatment.

In this fashion, reading and comparison of a plurality of images is carried out daily in a wide variety of fields. To facilitate such comparative reading, there are cases in which the two or more images are displayed on a display means such as a monitor. In other words, the image is converted to luminescence and density signals and displayed on a monitor, etc.

Although the area of the most interest to the viewer of such images is the area wherein the greatest difference is shown, when the two or more images that are to become objects of comparative reading are compared, it is a common practice to simply line them up and display them. However, under such conditions, the smaller the difference between the images is, the more difficult it becomes to discern, leading to a desire for an improvement in comparative reading performance.

The positions of the same structural components appearing in each of the two images are coordinated by transforming at least one of the images, after which the pixels of both images are coordinated (positions coordinated), and by performing a subtraction process, a difference image representing the difference between the two images is obtained. By displaying the subtraction image on a CRT, etc. display means, the reader of the image can easily discern the difference between the two images.

However, in an image such as a radiation image of human chest, in which contains tissues of different densities, such as ribs, backbone, muscle tissue, organs and other soft tissues, are contained in the same image, there are cases in which different values for the direction of the positions of the bone and soft-tissue structures are shown, corresponding to the amount of change in the position (the standing position when the image was obtained, the direction faced, etc.) of the subject (human body). Conventionally, position matching has been performed based on the amount of change and the direction of change, without regard as to whether the change was due to a change in the bone or the soft-tissue structures. Accordingly, because the differences based on the bone and soft-tissue structures become mixed in the amount of change and direction of change used to perform position matching, for cases in which there has been a difference in the amount of change in the bone structures and the soft-tissue structures, accurate matching of positions between portions of the images has not been possible, and there have been cases in which a subtraction image has been formed in which both bone structure artifacts and soft-tissue structure artifacts have remained; it has been difficult to achieve satisfactory diagnosis using subtraction images in which different types of artifacts from various structural components remained. For example, for cases in which bone structures and soft-tissue structures are adjacent, or stacked (for example, a case in which a rib and a blood vessel are stacked), the direction of change of the bone structure, for example, to the right, the direction of change of the soft-tissue structure next to the bone structure is in the opposite direction, to the left, and if these are employed for position matching the positions become even less exact, and in a worst case scenario, even more than one rib becomes mispositioned.

SUMMARY OF THE INVENTION

The present invention has been developed in consideration of the circumstances described above. It is a main object of the present invention to provide an image position matching method and apparatus in which, by improving, with respect to the prior art, the contrast accuracy of the target portion of two or more images obtained of the same subject that are to become the objects of comparative reading, performance of comparative reading is improved.

According to the image position matching method of the present invention, the positions of two or more images are matched: a specific-structure emphasized image, in which a specific structure is emphasized, is obtained for each of the two or more images; the correlation of structural positions between the specific-structure emphasized images is obtained, and based on the correlation between structural positions, the positions of the two or more images are matched.

Here, the expression "specific-structure emphasized image" refers to, for cases in which the two or more images are medical-use radiation images, bone-structure emphasized images and soft-tissue emphasized images.

The expression "bone-structure emphasized image" refers to any image that can constitute one of the two or more images, in which the bone structures have been emphasized, whose positions are to be matched, such as those energy subtraction images, from among the energy subtraction images formed based on two energy subtraction-use original images having different energy levels, in which the bone structures have been emphasized, or an edge-emphasized image in which the straight edges corresponding to the ribs within an image are emphasized, etc. In addition, the expression "soft-tissue emphasized image" refers to any image that can constitute one of the two or more images, in which the soft-tissue structures have been emphasized, whose positions are to be matched, such as the soft-tissue images among energy subtraction images, or an image in which the horizontal straight edges (corresponding to the ribs) have been blurred, etc.

That is to say, according to the image position matching method of the present invention described above, aforementioned two or more images are two or more pairs of energy subtraction-use original images, and aforementioned specific-structure emphasized images can be energy subtraction images obtained based on each pair of energy subtraction-use original images. In other words, according to the image position matching method in which the positions between each pair of two or more pairs of energy subtraction-use original images are to be matched: an energy subtraction image is obtained based on each pair of energy subtraction-use original images; the correlation of the structural positions between each pair is obtained; and based on the correlation between structural positions obtained for the energy subtraction images, the positions between aforementioned pairs of energy subtraction-use original images are matched.

Here, because at least one energy subtraction image can be obtained based on at least two original images having different energy distributions, aforementioned "two or more pairs of energy subtraction-use original images" refers to the existence of two or more pairs of original images (energy subtraction-use original images) for obtaining at least one energy subtraction image. That is to say, for cases in which energy subtraction images are utilized as bone-structure emphasized images and soft-tissue structure emphasized images, all together, there must be a minimum of four original images. For example, if there are original images S1 and S2 having different energy distributions, based on these two original images S1 and S2, a single energy subtraction image Ssu1 can be obtained based on the subtraction formula below.

$$Ssu1 = \alpha S1 - \beta S2$$

In this equation, $\alpha$ and $\beta$ are weighting coefficients, and by changing the values thereof, multiple energy subtraction images Ssu1 (for example, a bone image used as a bone-structure emphasized image, a soft-tissue image used as a soft-tissue structure emphasized image) can be obtained. These two original images S1 and S2 constitute one pair of energy subtraction-use original images.

The expression "matching the positions of two or more pairs of energy subtraction-use original images (two or more images)" refers to, for a case in which there is a first pair of energy subtraction-use original images S11 and S12 and a second pair of energy subtraction-use original images S21 and S22, matching the positions of image S11 from the first pair and image S21 from the second pair. Of course, the positions of image S12 of the first pair and image S22 of the second pair can also be matched, as can the positions of image S11 of the first pair and image S22 of the second pair, and also the positions of image S12 of the first pair and image S21 of the second pair. However, in general, two types of energy subtraction-use original images are employed, high-energy X-ray exposed images (high-energy images) and low-energy X-ray exposed images (low-energy images). It is therefore preferable that position matching be performed between two images that are both low-energy images, or between two images that are both high-energy images. Further, because low-energy images have a comparatively low noise component, it is more preferable that position matching be carried out between two images that are both low-energy images.

Note that applicable subjects include the human body, plant and animals, industrial products, geological formations, heavenly bodies, landscapes, etc.

In addition, the expression "the correlation between structural positions" refers to the relationship between the structural elements of the subject recorded in an image when coordinated with the same structural elements in another image obtained of the same subject it does not refer to ignoring the structural elements in the image and performing a simple formulaic matching of positions at 00 cm from the left edge of the image and 0X cm from the top edge. Note that "structural" refers to not only the outwardly apparent structures in the image, but can also refer to anatomical structural bodies (for example, a lung field, the breast one, the neck, etc.). In comparative reading in the medical field, these are the areas of most interest.

In addition, in the image position matching method according to the present invention, the positions of aforementioned two or more images may be matched based on the position correlation obtained by subjecting the correlation of structural positions within the bone-structure emphasized images and the correlation of structural positions with the soft-tissue emphasized images to a weighted addition process employing a predetermined ratio. That is to say, the correlation between the structural positions of the bone-structure emphasized image of the first image and the bone-structure emphasized image of the second image, designated as P1, and the correlation between the structural positions of the soft-tissue structure emphasized image of the first image and the soft-tissue structure emphasized image of the second image, designated as P2, are subjected to a weighted addition process to obtain position correlation P3 (=mP1+nP2; where m+n=1), based upon which the positions of the first and second images can be matched. Further, the values of m and n can be changed in succession, whereby the value of P3 is changed in succession and the state of the position matching is changed therewith.

Also, the predetermined ratio employed in the weighted addition process can be set for two or more positions within an image. That is to say, position correlation P3 can be obtained for separate positions within an image by changing the values of aforementioned m and n to appropriate values.

The image position matching apparatus according to the present invention implements the image position matching method of the present invention, and comprises an image position matching means for matching the positions of two or more images, which comprises a structure-emphasized image obtaining means for obtaining an image, for each of aforementioned two or more images, in which a specific structure is emphasized, and a structural-position relation obtaining means for obtaining the correlation between structural positions of the specific-structure emphasized images obtained by the structure-emphasized image obtaining means, wherein the image position matching means matches the positions of aforementioned two or more images based on the structural-position relation obtained by the structural-position relation obtaining means.

In addition, each of aforementioned two or more images can be a medical-use radiation image, and aforementioned specific-structure emphasized image can be a bone-structure emphasized image and/or a soft-tissue structure emphasized image.

The image position matching apparatus according to the present invention further comprises a position correlation obtaining means that obtains the position correlation by subjecting the correlation of structural positions within the bone-structure emphasized images and the correlation of structural positions with the soft-tissue emphasized images to a weighted addition process employing a predetermined ratio, and the position matching means can match, based on the position correlation obtained by the position correlation obtaining means, the positions of aforementioned two or more images. Further, the position correlation obtaining means can be provided so that it is possible for it to set the predetermined ratio employed in the weighted addition process for each position within aforementioned two or more images.

In addition, the structural-position relation obtaining means carries out a global transformation between the Specific-structure emphasized images, and the specific-structure images that have been subjected to the global transformation are then divided into a plurality of hypothetical small narrow regions, and by coordinated each of the thereby obtained small narrow regions and subjecting them to a local transformation, the structural-position relation can be obtained.

Further, aforementioned two or more images are two or more pairs of energy subtraction-use original images, and aforementioned specific-structure emphasized image can be an energy subtraction image obtained based on each pair of energy subtraction-use original images. That is to say, the image position matching apparatus according to the present invention comprises a position matching means for matching the positions between two or more pairs of energy subtraction-use original images, further comprising an energy subtraction means for obtaining an energy subtraction image based on each pair of energy subtraction-use original images, and a position correlation obtaining means for obtaining the correlation of the structural positions between each pair of the obtained energy subtraction images, wherein the position matching means, based on the structural-position relation obtained of the energy subtraction images, can match the positions between aforementioned pairs of energy subtraction-use original images.

Still further, the bone-structure emphasized image can be an edge-emphasized image of two or more images.

Note that aforementioned two or more images can be images acquired at different points in time in a time series manner, and they can also be images that have been taken of the same subject and are to become the objects of comparative reading.

According to the image position matching method and apparatus of the present invention, in the image matching method in which the positions of two or more images are matched, the structural-position relation between the specific-structure emphasized images obtained for each image, and because the positions of aforementioned two or more images are matched based on the obtained structural-position relation, it is possible to match aforementioned specific-structure emphasized images with a higher degree of accuracy, and as a result the types of structural components of which artifacts remain in an image can be limited, and the reader of the images can easily distinguish between the artifacts remaining in an image and the difference between aforementioned two or more images, and the difference between aforementioned two or more images is made plain to see.

That is to say, a soft-tissue structure emphasized image, for example, is obtained based on two or more images, the correlation between the structural positions of the soft-tissue structure emphasized images is obtained by the structural-position relation obtaining means, and because the position matching means matches the positions of aforementioned two or more images, based on the thus obtained structural-position relation, the same structural positions of the soft-tissue structures are almost completely eliminated in the difference image, however, the difference between the soft-tissue structures of two images (for example, an unusual shadow, etc. that is present in only one of the images) and artifacts of the bone structures remain.

However, as for both the positive densities (high density) and the negative densities (low density) appearing in the narrow range inserted right into the outline of the outline out the artifacts of the bone structures, the shadow of the soft-tissue structure has none. Accordingly, the shadow of the soft-tissue structure (the difference) can be easily distinguished from the artifacts.

In this way, when the positions of two or more images are matched and a subtraction image is formed by the image position matching method an apparatus according to the present invention, the formation of the type of halfway subtraction image containing artifacts of bone structures, soft-tissue structures, etc. formed by conventional means is prevented, a variety of types of subtraction images are provided, and diagnosis can be satisfactorily performed.

Moreover, based on the position correlation obtained by subjecting the structural-position relation between the bone-structure emphasized images and the structural-position relation between the soft-tissue structure emphasized images to a weighted addition process employing a predetermined ratio, it is possible to obtain a subtraction image in which both the bone structures and soft-tissue structures have been eliminated, to a certain degree, and by changing the value of the predetermined ratio within an appropriate range, a variety of subtraction images can be obtained, and it is therefore possible to form images the are matched to a readers requirements, such as an image for viewing the change over time, or an image showing the originating cause of an ailment, etc.

In addition, if it is possible to set the predetermined ratio, which is employed in performing the weighted addition process, for each position within an image, because it becomes possible to change the structural-position relation according to the degree of misalignment characteristic of each position within an image by use of the weighted addition process and match positions, for example, due to a change in posture, even for cases in which the degree and direction of misalignment differ from position to position, likewise positions can, to a certain extent, be matched.

As used in this specification, the term "correlation" refers to the correspondent positional relationships of structures within a plurality of images.

DESCRIPTION OF THE PREFERRED EMBODIMENTS

Hereinafter, a preferred embodiment of the image position matching method and apparatus according to the present invention will be explained with reference to the drawings.

Figure 1:
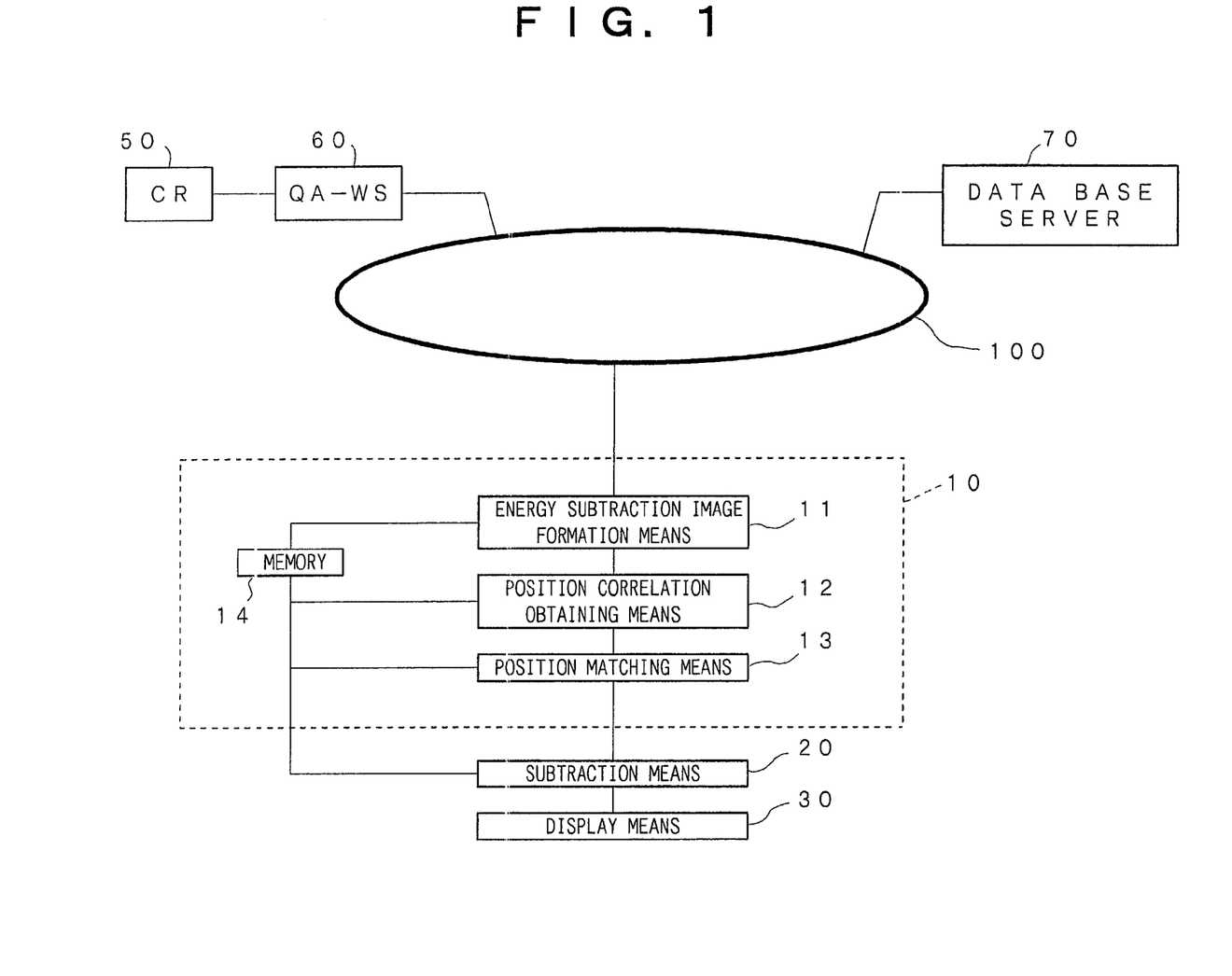
FIG. 1 shows a medical network implementing the position matching apparatus according to the present invention.

FIG. 1 shows a medical network 100 implementing an embodiment of the image position matching method and apparatus according to the present invention.

Connected to network 100 shown in the drawing are: a CR (Computer Radiography) 50 or other such medical image formation apparatus such as a CT (Computer Tomography) apparatus, MRI (Medical Resonance) apparatus, etc.; a cumulative data base 70 for storing each type of diagnostic image created by aforementioned medical image formation apparatuses; a display apparatus (not shown) for displaying images stored in database 70 and images transmitted directly from the image formation apparatuses; an image position matching apparatus for matching the positions of images stored in database 70 or transmitted directly from the medical image formation apparatuses; a subtraction means 20 for performing subtraction processing on images whose positions have been matched by image position matching apparatus 10; an image display means 30 for displaying subtraction image obtained by subtraction means as a visual image. Note that also connected to network 100 are various types of image output devices such as printers, etc. for outputting images circulated within the network to film, etc. which, along with the CR and MRI apparatuses are not shown in the drawings.

An image of a subject through which radiation is obtained by CR apparatus 50, which is provided with a sheet that has a stimulable phosphor layer that absorbs some of the radiation energy passed through the subject and records an image thereof thereon. Afterwards, and by photoelectrically reading the radiation energy stored thereon, which is emitted as a stimulated emission when said stimulable phosphor sheet is irradiated with a laser beam, the apparatus obtains the radiation image of the subject as digital image data; such systems are in wide use in medical facilities.

QA-WS workstation 60 (for checking image quality), which is connected along the network between CR apparatus 50 and network 100, checks images formed by aforementioned CR apparatus 50 and other medical image formation apparatuses, and is provided with a function for issuing a request to a request to the medical image forming apparatus (CR apparatus 50, etc>), to re-take an image, etc. In this embodiment, before storing digital image P created by CR apparatus 50 into database 70, QA-WS 60 is provided so as to perform an image quality check of the image density, contrast, etc. and also a check of the photographed range of the image, etc.

Image processing apparatus 10 comprises: an energy subtraction image formation means (structure-emphasized image obtaining means) 11 for obtaining, for each pair of energy subtraction-use original images S11, S12 and S21, S22, each said pair having been obtained on the same day and having been input thereto via network 100, an energy subtraction image Ssu11 an Ssu21, respectively; a structural-position relation obtaining means (including a means for computing the correlation between structural positions) 12; and an image position matching means 13 for carrying out position matching processing, based on the correlation between structural positions, and matching the positions of images Ssu11 and Ssu21, both of which are low-energy images from among the energy subtraction images.

Next, the operation of medical network 100 implementing the image position matching apparatus of the current embodiment will be explained.

Energy subtraction images S11, S12, and S21, S22, obtained of the chest of a specific patient in advance by CR apparatus 50, each respective pair having been obtained at different points in time, said images S11, S12 (S11 and S12 having been obtained on the same day) and images S21, S22 (images S21 and S22 both having been obtained on the same day) are subjected to an image quality control check by QA-WS60, after which they are cumulatively stored in database 70. Information including the unique patient ID number of the patient of whom images have been obtained, the photographed part (in this explanation, the chest), a symbol indicating the body position in which the image was obtained, the date the image was obtained, whether the image is the energy subtraction-use original image including information as to whether it is a high energy image or a low energy image, is appended to stored images S11, S12, and S21, S22 as header information. Note that the two original images S11 and S21 have been obtained at different points in time, are front views of the chest of the same patient, and are to become the subjects of comparative reading. The first image of the second pair, S21 has been obtained at a more recent point in time than the first image of the first pair, S11, and therefore, the first image of the first group is to be referred to as a past image and the first image of the second group as the present image.

First, energy subtraction-use original images S11 and S12, which are the first and second images of pair 1 from among the energy subtraction-use original images, having header information containing the same patient ID number, the same symbol of the photographed part, and the same date on which the image was obtained are input from database 70 via network 100 into energy extraction image forming means 11 of image processing apparatus 10. As shown in the flow of processing in FIG. 2, energy subtraction image forming means 11 obtains an energy subtraction image Ssu11, based on the input original images S11 and S12. Energy subtraction images, as disclosed in Japanese Unexamined Patent Publication Nos. 59(1983)-83484 and 3(1989)-285475, etc. for each original image S11 and S12, which each have different energy distributions, represented by original image signal S11 and S12 (for the sake of simplicity in the explanation, the are both designated in the same way, as original image S11 and S12) respectively, upon matching of the structural positions thereof, the signal values of the pixels in each image, S11 and S12, corresponding to a predetermined structural component therein are weighted so as to be substantially matched, and by carrying out subtraction processing between the corresponding pixel signal values, image (energy subtraction image) Ssu11 (=αS11−βS12; α and β each being a weighting coefficient) is an image in which the predetermined structural component has been substantially eliminated, and in particular, multiple structural components having different energy absorption rates are separated, and viewing of said image is rendered effective.

Figure 2:
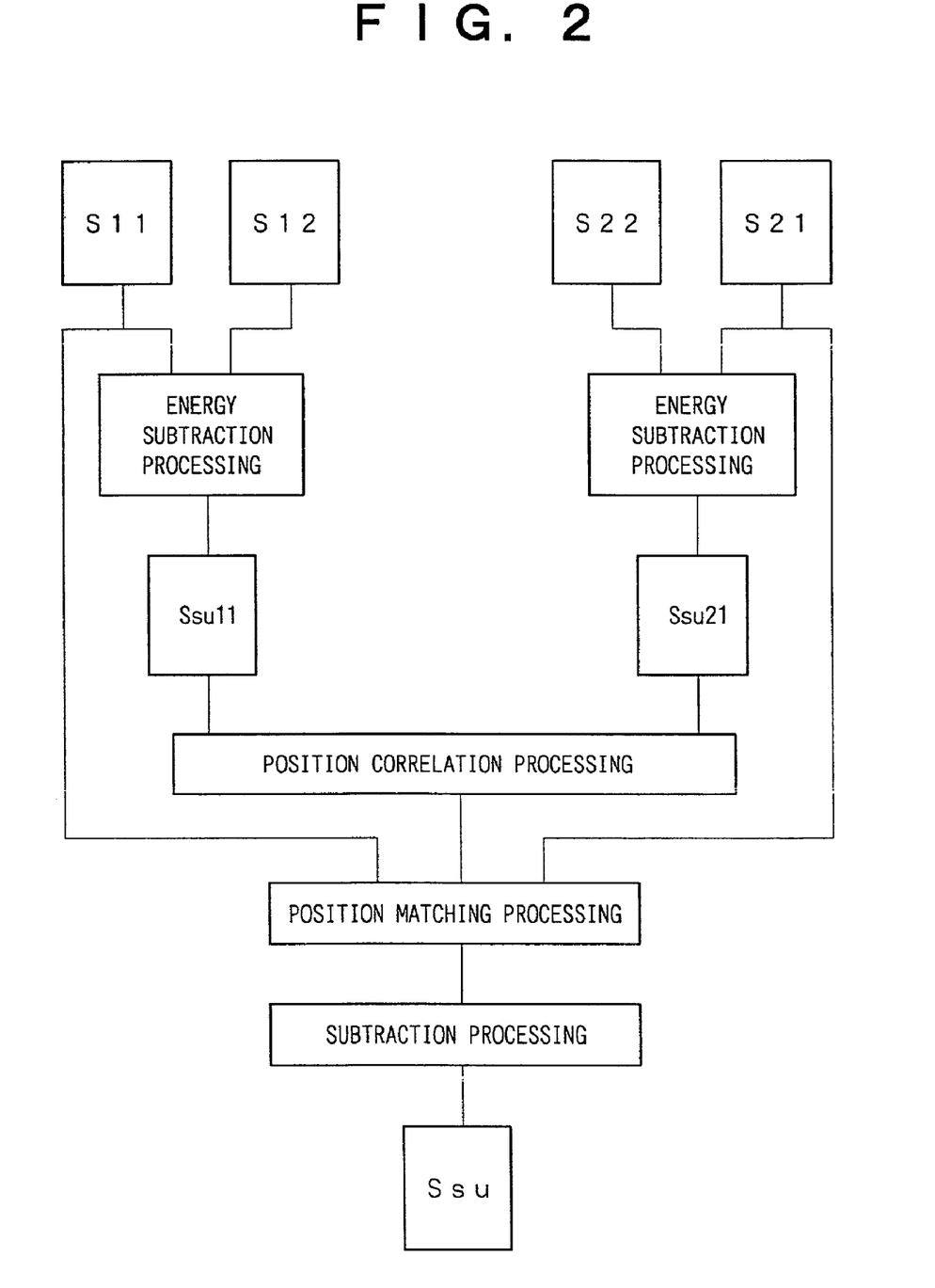
FIG. 2 is a flowchart of the main processes of the image position matching apparatus shown in the medical network of FIG. 1.

In the current embodiment, by making the signal component representing the bone structures in both original images S11 and S12 and subjecting them to subtraction processing, a soft tissue image in which the bone structures have been eliminated is obtained as an energy subtraction image Ssu11.

In the same way, another pair of energy subtraction-use original images, S21 (the first image of the second pair) and S22 (the second image of the second pair), are input to energy subtraction image forming means 11, and based on these, a soft tissue image in which the bone structures have been eliminated is obtained as an energy subtraction image Ssu12.

Energy subtraction images (soft-tissue) Ssu11 and Ssu12 obtained in this way are input into position correlation obtaining means 12, and original images S11, S12, and S21, S22, which served as the basis for obtaining the energy subtraction images, are stored in memory 14.

Here, although the either of thus obtained energy subtraction images (soft-tissue) Ssu11 and Ssu12 are soft-tissue images in from which the bone structures have been eliminated, because the first and second pairs of original images were each obtained at different points in time, in both pairs of images there are differences in the body position at which the images were obtained, and therefore, there are differences in the structural positions of the soft-tissue components in each of the subtraction images Ssu11 and Ssu21 (soft tissue) obtained of each respective pair of original images. Note that the corresponding positions of the predetermined structural component are referred to as corresponding structural positions.

Position correlation obtaining means 12 obtains the correlation between structural positions within subtraction images (soft tissue) Ssu11 and Ssu21 input thereto. That is to say, by performance of a linear transformation, globally matching is carried out between energy subtraction images Ssu11 and Ssu21, and the energy subtraction images (soft-tissue) Ssu11 and Ssu12 subjected to the global position matching are then divided into a plurality of small, narrow hypothetical regions, each of which is then coordinated with its respective counterpart, and by carrying out a local matching process, position correlation obtaining means obtains the correlation between structural positions. More specifically, first, one image of the pair of energy subtraction images (soft-tissue) Ssu11 and Ssu12 (for example, subtraction image Ssu11 obtained of the first pair of original images) serves as the base image, and in order to substantially match thereto the structural components (structures contained within the soft-tissue image) of the other subtraction image (for example subtraction image Ssu21 obtained of the second pair of original images), is subjected to an overall, general position matching (global position matching) by performance of an affine or other such linear transformation. Next, one image of the pair of the thus globally matched energy subtraction images Ssu11 and Ssu21 (for example, subtraction image Ssu11 obtained of the first pair of original images) is divided into a plurality of hypothetical small, narrow regions (template regions), and after template search regions larger than and corresponding to each said template region are set within the other subtraction image (for example, subtraction image Ssu21 obtained of the second pair of original images, which has been subjected to global matching), in order to substantially match the image portion of each template region to the image portion of the corresponding template search region of the counterpart subtraction image, each template search region is moved into the corresponding template region, and local matching is performed to obtain the correlation between the position of each template and template search region. Note that according to local matching, because the correlation between each small narrow region differs, a non-linear matching process different from that employed in the first matching step, that is, global matching.

Once the correlation between subtraction images (soft tissue) Ssu11 and Ssu21 is obtained in this way, said correlation between structural positions is input to position matching means 13 as the position correlation to be used when matching the positions of the original images. Based on the position correlation input thereto, position matching means 13 carries out the process of matching the positions of the first image, of the first pair of original images, Ssu11, and the first image of the second pair of original images, Ssu21 (both of which are low-energy images) input from memory 14.

Here, because the position correlation input to position matching means 13 is the correlation between the structural positions of energy subtraction images (soft tissue) Ssu11 and Ssu21, it is the correlation between the positions of the soft-tissue structures within original images S11 and S21. Therefore, only the soft-tissue structures of original images S11 and S21 are matched when position matching is performed by position matching means 13.

After images S11 and S21 have been subjected to position matching by position matching means 13, they are output from image matching apparatus 10 and input to subtraction means 20. Subtraction means 20 subjects original images S11 and S21, in which the soft-tissue structures have been matched, to a predetermined weighting, and then coordinates the pixels therein and carries subtraction processing therebetween. Although artifacts of the bone structures remain in the resulting subtraction image Ssu obtained of the image from the first group and the image from the second group, almost no artifacts of the soft-tissue structures remain therein, and only the change that has occurred to the soft-tissue structures over time appears in the image. This image is then input to image display means 30, and the visible image of subtraction image Ssu output thereon serves as a diagnostic image for a doctor, etc. reader of the image.

Here, the artifacts of the bone structures and the portion of the soft-tissue structure that has changed over time are clearly distinguishable to an examiner of the image. That is to say, when the misalignment between positions was not taken into consideration, both the high and low density portions the artifacts appearing in the subtraction image due to misalignment of structural positions appear extremely close to each other, whereas the portion of the soft-tissue structure that has changed over time appears simply as a high or low density portion. Accordingly, even if artifacts of the bone structures remain, because the artifacts of the soft-tissue structures, which are difficult to distinguish from the soft-tissue structures, have been eliminated, the image offers excellent comparative reading performance to a doctor or other examiner of the image.

According to the image position matching apparatus of the current embodiment, formation of a subtraction image in which various artifacts of both the bone and soft-tissue structures remain, as produced in the conventional art, based on two or more images obtained of the same subject that are to become the objects of reading and comparison, can be prevented, a variety of subtraction images are offered, and diagnosis employing said images can be performed satisfactorily.

Next, a second preferred embodiment of the present invention will be explained. Note that because many of the structures and functions of the second preferred embodiment are the same as those of the first embodiment, FIG. 1 will be referred to with respect to structures, and only those aspects differing with the first embodiment will be explained.

In the current embodiment, energy subtraction image formation means 11 forms energy subtraction images (soft tissue) Ssu11 and Ssu21 from which the bone structures have been substantially eliminated, and energy subtraction images (bone) Ssu12 and Ssu22 from which the soft-tissue structures have been substantially eliminated, and inputs said formed energy subtraction images to position correlation obtaining means 12. In addition, original images S11, S12 and S21, S22, which served as the basis of the energy subtraction images, are stored in memory 14.

Here, because the two energy subtraction images (bone) Ssu12, Ssu22 are images that have been obtained in the same way as the soft tissue energy subtraction images of the first embodiment, based on original images obtained of the same subject at different points in time, there is a difference in the images due to the difference in body position when the images were obtained. The difference in the position of the same bone structures in the images due to the difference in body position at the time the images were obtained is not necessarily the same as the difference between the soft-tissue structures contained therein. There are cases for which the difference occurs in another direction.

First, position correlation obtaining means 12 obtains the correlation P1 between the structural positions of subtraction images (bone) Ssu12 and Ssu22 input thereto, and the correlation P2 of structural positions between the structural positions of subtraction images (soft tissue) Ssu11 and Ssu21 input thereto. Also, structural-position relation (bone) P1 and structural are subjected to a weighted addition process employing a predetermined ratio, whereby a position correlation (original image) P3 (=mP1+nP2, where m+n=1) is obtained.

Figure 3:
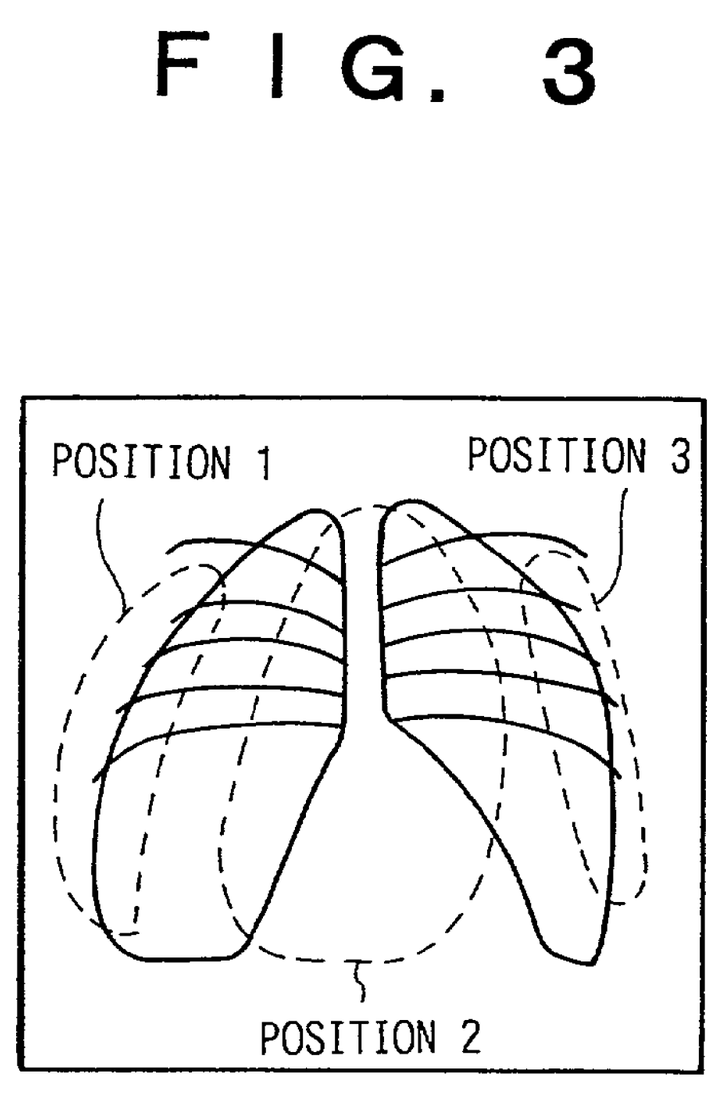
FIG. 3 shows the positions 1–3 occurring in a chest X-ray.

Here, the predetermined ratios (m, n) employed when the weighted addition is performed are switched between each section 1–3 of the original image (refer to the chest image of FIG. 3), and position correlation P3 is obtained for each position. For example, structural-position relation (bone) P1 for positions 1 and 3, where m=1, n=0, is set as P3, structural-position relation (soft tissue) P2 for position 2, where m=0, n=1, is set as P3, and for portions intermediate of those, m, n are set so as to linearly interpolate therebetween, and position correlation P3 is obtained. Because the position (range) of each position described above can be set automatically if the chest detection method as disclosed, for example, in Japanese Patent Application 2000-298100, is used, the predetermined ratios employed in the weighted addition can be set automatically for each position and the position correlation P3 obtained. In addition, the predetermined ratios (m, n) employed in the weighted addition process can be set manually by the examiner of an image.

Position matching means 13 changes the position correlation P3 of each position of the original images S11 and S21 input thereto from memory 14 and matches the positions, based on the position correlation P3 input thereto from position correlation obtaining means 12.

Here, because the position correlations input to position matching means 13 for each position are position correlations that have been obtained by matching the characteristics (the degree of the direction of misalignment) of each position of the original images and subjecting each position to a weighted addition process, a high degree accuracy can be obtained in matching the positions. That is to say, even for images in which the structural components are misaligned due to the differing directions of the disposition thereof, because the position of each structural component is matched in an appropriate direction, a certain degree of accuracy can be obtained in matching each position.

Note that in the position matching apparatus of the first embodiment described above, although energy subtraction image forming means 11 obtained a soft-tissue image in which the bone structures had been eliminated, the image position matching method and apparatus according to the present invention are not limited to the configuration of the first embodiment; for example, opposite to that described for the first embodiment, a bone-structure image in which the soft-tissue structures have been eliminated can also be formed, or a bone-structure image and a soft-tissue image can each be formed, wherein a subtraction image Ssu, in which the bone structures in the same positions are eliminated from the bone-structure image (as an energy subtraction image) and a subtraction image Ssu', in which the soft-tissue structures in the same positions are eliminated from the soft-tissue structure image (as an energy subtraction image) are obtained, said two time-lapse subtraction images can then both be displayed, or for example, image Ssu" obtained by subjecting said to subtraction images to a weighted addition process (where, Ssu"=<m×Ssu+n×Ssu'>/<m+n>; wherein m, n are constants) can be displayed. Further, coefficients m, n can be changed in succession to obtain morphing images, which are then displayed.

In addition, in each of the preferred embodiments described above, an example was given employing structure-emphasized visible images (bone-structure emphasized image, soft-tissue emphasized image), however, the structure-emphasized images produced by the present invention are not limited to such, for example, as disclosed in Japanese Patent Application 2000-303743, a rib cage image in which straight edges are emphasized can be used as the bone-structure emphasized image, and a blurred image in which the edges running in the horizontal direction (the direction of the ribs) are emphasized can be used as the soft-tissue emphasized image.

Further, according to the image position matching apparatus implemented in each embodiment described above, although the position correlation for two energy subtraction image was obtained based on application of the present invention to the low energy images from among the original images, it goes without saying that the present invention can be applied to the high-energy images as well.

What is claimed is:

1. An image position matching method for matching the structural positions of two or more images, comprising the steps of:
   obtaining a specific-structure emphasized image in which a specific structural component is emphasized for each of said two or more images, said images comprising a plurality of types of structures; and
   obtaining correspondent positional relationships among the structural positions of said specific-structure emphasized images; and
   matching the structural positions of said two or more images, based on the obtained correspondent positional relationships,
   wherein said specific structural component is a type of structure selected from said plurality of structures.

2. An image position matching method as defined in claim 1, wherein
   said two or more images are medical radiation images,
   wherein the plurality of types of structures comprise bones or soft tissue, and wherein said specific-structure emphasized images are bone-structure emphasized images and/or soft-tissue emphasized images.

3. An image position matching method for matching the structural positions of two or more images, comprising the steps of
   obtaining a specific-structure emphasized image in which a specific structural component is emphasized in each of two or more images;
   obtaining correspondent positional relationships among the structural positions of said specific-structure emphasized images; and
   matching the structural positions of said two or more images, based on the obtained correspondent positional relationships,
   wherein said two or more images are medical radiation images, and said specific-structure emphasized images are bone-structure emphasized images and/or soft-tissue emphasized images, and
   wherein:
   a first correspondent positional relationship is obtained for structural positions in said bone-structure emphasized images;
   a second correspondent positional relationship is obtained for structural positions in said soft-tissue emphasized images;

the first and second correspondent positional relationships are weighted at a predetermined ratio then added to each other; and the two or more images are matched in position, based on the weighted sum of the first and second correspondent positional relationships.

4. An images position matching method as defined in claim 3, wherein said predetermined ratio is set for each position within said two or more images.

5. An images position matching method as defined in any one of claims 1, 2, 3, and 4, wherein said two or more images comprise two or more pairs of original images for energy subtraction, and the specific-structure emphasized image is an energy subtraction image obtained based on each pair of said original images for energy subtraction.

6. An images position matching method as defined in any one of claims 2, 3, and 4, wherein said bone-structure emphasized images are edge-emphasized images of each of said two or more images.

7. An image position matching apparatus comprising a position matching means for matching the positions of two or more images, further comprising a structure-emphasized image obtaining means for obtaining a structure-emphasized image, in which a specific structural component is emphasized, for each of said two or more images, said images comprising a plurality of types of structures; and a correspondent positional relationship calculating means for obtaining the correspondent positional relationships among positions of specific-structure emphasized images obtained by said specific-structure emphasized obtaining means, wherein said image position matching means matches the positions of said two or more images, based on the correspondent positional relationships obtained by said correspondent positional relationship calculating means, and wherein said specific structural component is a type of structure selected from said plurality of structures.

8. An image position matching apparatus as defined in claim 7, wherein said two or more images are medical radiation images, wherein the plurality of types of structures comprise bones or soft tissue, and said specific-structure emphasized images are bone-structure emphasized images and/or soft-tissue emphasized images.

9. An image position matching apparatus comprising a position matching means for matching the positions of two or more images, further comprising:

a structure-emphasized image obtaining means for obtaining a structure-emphasized image, in which a specific structure is emphasized, for each of said two or more images; and a correspondent positional relationship calculating means for obtaining the correspondent positional relationships among positions of specific-structure emphasized images obtained by said specific-structure emphasized obtaining means, wherein said image position matching means matches the positions of said two or more images, based on the correspondent positional relationships obtained by said correspondent positional relationship calculating means, wherein said two or more images are medical radiation images, and said specific-structure emphasized images are bone-structure emphasized images and/or soft-tissue emphasized images, wherein:

the correspondent positional relationship calculating means obtains a first correspondent positional relationship for structural positions in said bone-structure emphasized images;

obtains a second correspondent positional relationship for structural positions in said soft-tissue emphasized images; and weights the first and second correspondent positional relationships at a predetermined ratio then adds the first and second correspondent positional relationships to each other; and wherein the two or more images are matched in position, based on the weighted sum of the first and second correspondent positional relationships, calculated by the correspondent positional relationship calculating means.

10. An image position matching apparatus as defined in claim 9, wherein said correspondent positional relationship calculating means is capable of setting said predetermined ratio for each position within said two or more images.

11. An image position matching apparatus as defined in any one of claims 7, 8, 9, and 10, wherein said correspondent positional relationship calculating means performs global matching between said specific-structure emphasized images, and then divides said globally matched specific-structure emphasized images into a plurality of small narrow virtual regions, and obtains the correspondent positional relationships among the structural positions thereof by subjecting corresponding small narrow regions obtained thereby to local matching.

12. An image position matching apparatus as defined in any one of claims 7, 8, 9, and 10 wherein said two or more images comprise two or more pairs of original images for energy subtraction, and said specific-structure emphasized image is an energy subtraction image obtained based on each pair of said original images for energy subtraction.

13. An image position matching apparatus as defined in claim 11, wherein said two or more images comprise two or more pairs of original images for energy subtraction, and said specific-structure emphasized image is an energy subtraction image obtained based on each pair of said original images for energy subtraction.

14. An image position matching apparatus as defined in any one of claims 8, 9, and 10, wherein said bone-structure emphasized images are edge-emphasized images of each of said two or more images.

15. An image position matching apparatus as defined in claim 11, wherein said bone-structure emphasized images are edge-emphasized images of each of said two or more images.

16. An image position matching apparatus as defined in any one of claims 7, 8, 9, and 10, wherein each of said two or more images has been obtained at a different point in time in a temporal series.

17. An image position matching apparatus as defined in claim 11, wherein each of said two or more images has been obtained at a different point in time in a temporal series.

18. An image position matching apparatus as defined in claim 12, wherein
each of said two or more images has been obtained at a different point in time in a temporal series.

19. An image position matching apparatus as defined in claim 13, wherein
each of said two or more images has been obtained at a different point in time in a temporal series.

20. An image position matching apparatus as defined in any one of claims 7, 8, 9, and 10, wherein
said two or more images are to become objects of comparative reading, and have been obtained of the same subject.

21. An image position matching apparatus as defined in claim 11, wherein
said two or more images are to become objects of comparative reading, and have been obtained of the same subject.

22. An image position matching apparatus as defined in claim 12, wherein
said two or more images are to become objects of comparative reading, and have been obtained of the same subject.

23. An image position matching apparatus as defined in claim 13, wherein
said two or more images are to become objects of comparative reading, and have been obtained of the same subject.

24. An image position matching apparatus as defined in claim 14, wherein
said two or more images are to become objects of comparative reading, and have been obtained of the same subject.

25. The image position matching method as defined in claim 1, further comprising the step of:
subtracting said two or more structural position matched images.

26. The image position apparatus as defined in claim 7, further comprising:
subtraction means that subjects said two or more images, in which structures have been matched, to a pixel subtraction process.

27. The image position matching method as defined in claim 1, wherein said specific structural component which is emphasized in each image is consistently of a same structural type.

28. The image position matching method as defined in claim 27, wherein said specific structural component which is emphasized is consistently one of soft tissue and bone.

29. The image position apparatus as defined in claim 11, wherein the global matching comprises a linear transformation and the local matching comprises a non-linear transformation.

30. An image position matching method for matching the structural positions of two or more images, comprising the steps of
obtaining a specific-structure emphasized image in which a specific structural component is emphasized in each of two or more images, and
obtaining correspondent positional relationships among the structural positions of said specific-structure emphasized images, and
matching the structural positions of said two or more images, based on the obtained correspondent positional relationships,
wherein said specific-structure emphasized images are at least one of bone-structure emphasized images and soft-tissue emphasized images, and
wherein:
a first correspondent positional relationship is obtained for structural positions in said bone-structure emphasized images;
a second correspondent positional relationship is obtained for structural positions in said soft-tissue emphasized images;
the first and second correspondent positional relationships are weighted at a predetermined ratio then added to each other; and
the two or more images are matched in position, based on the weighted sum of the first and second correspondent positional relationships.

31. An image position matching apparatus comprising a position matching means for matching the positions of two or more images, further comprising
a structure-emphasized image obtaining means for obtaining a structure-emphasized image, in which a specific structure is emphasized, for each of said two or more images, and
a correspondent positional relationship calculating means for obtaining the correspondent positional relationships among positions of specific-structure emphasized images obtained by said specific-structure emphasized obtaining means,
wherein said image position matching means matches the positions of said two or more images, based on the correspondent positional relationships obtained by said correspondent positional relationship calculating means,
wherein said specific-structure emphasized images are at least one of bone-structure emphasized images and soft-tissue emphasized images,
wherein:
the correspondent positional relationship calculating means obtains a first correspondent positional relationship for structural positions in said bone-structure emphasized images;
obtains a second correspondent positional relationship for structural positions in said soft-tissue emphasized images; and
weights the first and second correspondent positional relationships at a predetermined ratio then adds the first and second correspondent positional relationships to each other; and
wherein the two or more images are matched in position, based on the weighted sum of the first and second correspondent positional relationships, calculated by the correspondent positional relationship calculating means.

32. The image position matching method as defined in claim 1, wherein said two or more images that have been matched are original images prior to the obtaining of said specific-structure emphasized image.

33. The image position apparatus as defined in claim 7, wherein said two or more images that have been matched are original images prior to the obtaining of said specific-structure emphasized image.

* * * * *